United States Patent [19]

Brown

[11] Patent Number: 5,046,958

[45] Date of Patent: Sep. 10, 1991

[54] WELDING GROUND CLAMP

[76] Inventor: Ronald Brown, 4929 Gair Avenue, Terrace, B. C., CN V8G-2K1, Canada

[21] Appl. No.: 623,559

[22] Filed: Dec. 7, 1990

[51] Int. Cl.$^5$ ............................................. H01R 4/66
[52] U.S. Cl. ..................................... 439/92; 219/136
[58] Field of Search ................ 439/92, 100, 822, 829, 439/923; 81/420, 424.5, 426.5, 487; 219/136

[56] References Cited

U.S. PATENT DOCUMENTS 3,840,843  10/1974  Izraeli .................................. 439/923
4,820,901  4/1989  Peviani .................................. 439/92

Primary Examiner—Gary F. Paumen
Attorney, Agent, or Firm—Terry M. Gernstein

[57] ABSTRACT

A welding ground clamp includes a pair of frame legs that are connected together by a pivot pin assembly that also establishes electrical contact between the clamp and a ground cable. The electrical contact is such that the electrical path between the workpiece engaging elements of the clamp and the ground cable are all essentially identical, and the connection to the ground cable is spaced from the workpiece engaging elements. A handle locking assembly combines the advantages of both a spring assembly and a screw lock assembly and is located away from the workpiece engaging elements.

7 Claims, 4 Drawing Sheets

WELDING GROUND CLAMP

TECHNICAL FIELD OF THE INVENTION

The present invention relates to the general art of welding, and to the particular field of accessories used in welding processes.

BACKGROUND OF THE INVENTION

Arc welding is defined as a group of welding processes wherein coalescence is produced by heating with an electric arc, with or without the application of pressure and with or without the use of filler metal. In all cases, an arc is maintained between an electrode and the work, or between two electrodes, which form the terminals of an electric circuit.

More than a heat source, the arc is a complex mixture of ionized gas particles accelerated through an electric field constricted by a magnetic field, and exerting a profound effect on the transfer of filler material. In turn, arc behavior is dependent on filler material and base metal as well as circuit characteristics.

In an arc welding circuit, the workpiece is generally held at or near ground potential while the arch electrode is maintained at a positive potential with respect to the workpiece. Electric discharge between the electrode and the workpiece occurs and the arc is defined.

The ground welding cable is connected to the workpiece by a ground clamp. Such clamp should furnish a strong positive connection, yet be capable of a quick, easy attachment and removal, to both the workpiece and to the welding cable. The clamp should also be capable of withstanding abuse.

Most ground clamps used in welding processes fall into one of two categories, either the clamp is a spring actuated clamp or is a screw actuated clamp. While each of these clamps has certain advantages, each also has certain drawbacks.

For example, the spring clamp is prone to degraded performance due to the wear and tear it is subjected to during use. The spring becomes loose, and the electrical contact between the clamp and the workpiece becomes spotty or loose. This is especially the case if the workpiece is dirty or is covered with grease or oil, as is often the case. An incomplete contact between the ground and the workpiece can result in arcing and heating. All of these results are undesirable, and can reduce the life of the welding apparatus as well as inhibit the quality of the weld being made.

For this reason, many grounding clamps use a screw operated mechanism to attach the clamp to the workpiece. While many of the problems associated with spring actuated clamps are overcome by the screw actuated clamps, these clamps also have certain drawbacks. For example, the electrical circuit between the ground cable and the workpiece on one side of the clamp mechanism may be different from the electrical circuit on the other side of the workpiece. Since the clamps generally have a certain resistivity, that is, resistance per unit length for a given cross sectional area, this difference in electrical circuits can result in a difference in resistance between one path and another. Such difference in resistance will create a heating effect due to i²R heating. Such effect may generate heat that is transferred throughout the clamp and may degrade the overall performance of the clamp. Still further, most of the known screw operated clamps locate the screw mechanism in a position to be adversely affected by the energy generated by the arc. This can further degrade the performance of the clamp.

The use of the screw mechanism also does not have the quick action advantages of a spring operated mechanism, and thus can inhibit the use of the clamp.

The ground attachment is most efficient if it is established as close to the work area as possible. However, such close proximity to the arc may degrade the spring clamps, and may also be harmful to the screw actuated clamps since both types of clamps locate the operating mechanism close to the clamping area.

Therefore, there is a need for a welding ground clamp which forms a tight, proper grip close to the welding area and which evenly grounds all elements of the ground clamp, yet which will not significantly degrade over time and which is not subject to decreased performance due to dirt and the like on the workpiece as are present ground clamps.

OBJECTS OF THE INVENTION

It is a main object of the present invention is to provide a welding ground clamp which forms a tight, proper grip close to the welding area.

It is another object of the present invention to provide a welding ground clamp which forms a tight, proper grip close to the welding area and which evenly grounds all elements of the ground clamp.

It is another object of the present invention to provide a welding ground clamp which forms a tight, proper grip close to the welding area and which evenly grounds all elements of the ground clamp, yet which will not significantly degrade over time.

It is another object of the present invention to provide a welding ground clamp which forms a tight, proper grip close to the welding area and which evenly grounds all elements of the ground clamp, yet which will not significantly degrade over time and which is not subject to decreased performance due to dirt and the like on the workpiece.

SUMMARY OF THE INVENTION

These, and other, objects are achieved by a grounding clamp for use in a welding process which combines a screw actuator mechanism with a spring mechanism, and which connects the ground cable to the clamp in a manner which evenly distributes the electrical connection to all elements of the clamp. The clamp is designed to move the connection to the ground cable and the operating mechanism away from the elements of the clamp that contact the workpiece so that the connection of the ground cable to the clamp and the actuating mechanism will not be overly exposed to the arc, even if the clamp is located close to that arc. In this manner, the clamp can be used close to the work area, yet will not unduly expose the ground connection and the operating mechanism to the arc.

BRIEF DESCRIPTION OF THE DRAWING FIGURES

DETAILED DESCRIPTION OF THE PREFERRED EMBODIMENT OF THE INVENTION

Figure 1:
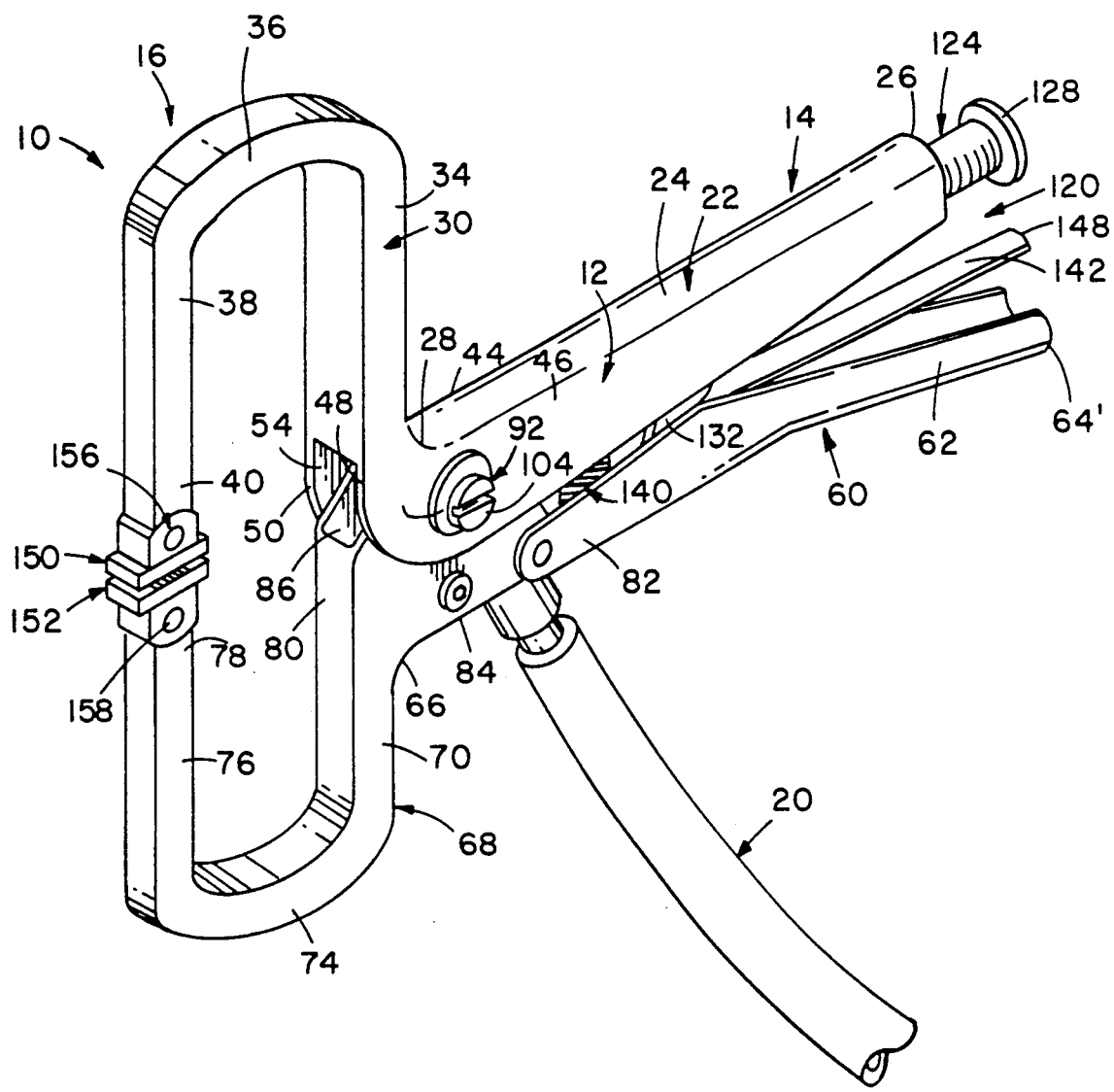
FIG. 1 is a perspective view of the welding ground clamp of the present invention.

Shown in FIG. 1 is a ground clamp 10 embodying the present invention. The ground clamp 10 includes a frame 12 which is grasped by a user at a handle end 14 and which contacts a workpiece (not shown) at a workpiece contacting end 16. The clamp 10 combines the desirable quick-release operation of a spring actuated clamp with the secure operation of the screw clamp, yet removes the actuating mechanism from the vicinity of the arc so that the drawbacks of these two individual mechanisms are avoided. The clamp 10 is connected to a ground cable 20 in a manner such that all electrical paths are essentially equal between the ground cable and the various elements of the clamp, and the connection to the cable 20 is removed from the vicinity of the arc. The clamp 10 further is designed to accept a wide range of workpiece thicknesses so the clamp is quite versatile.

Figure 2:
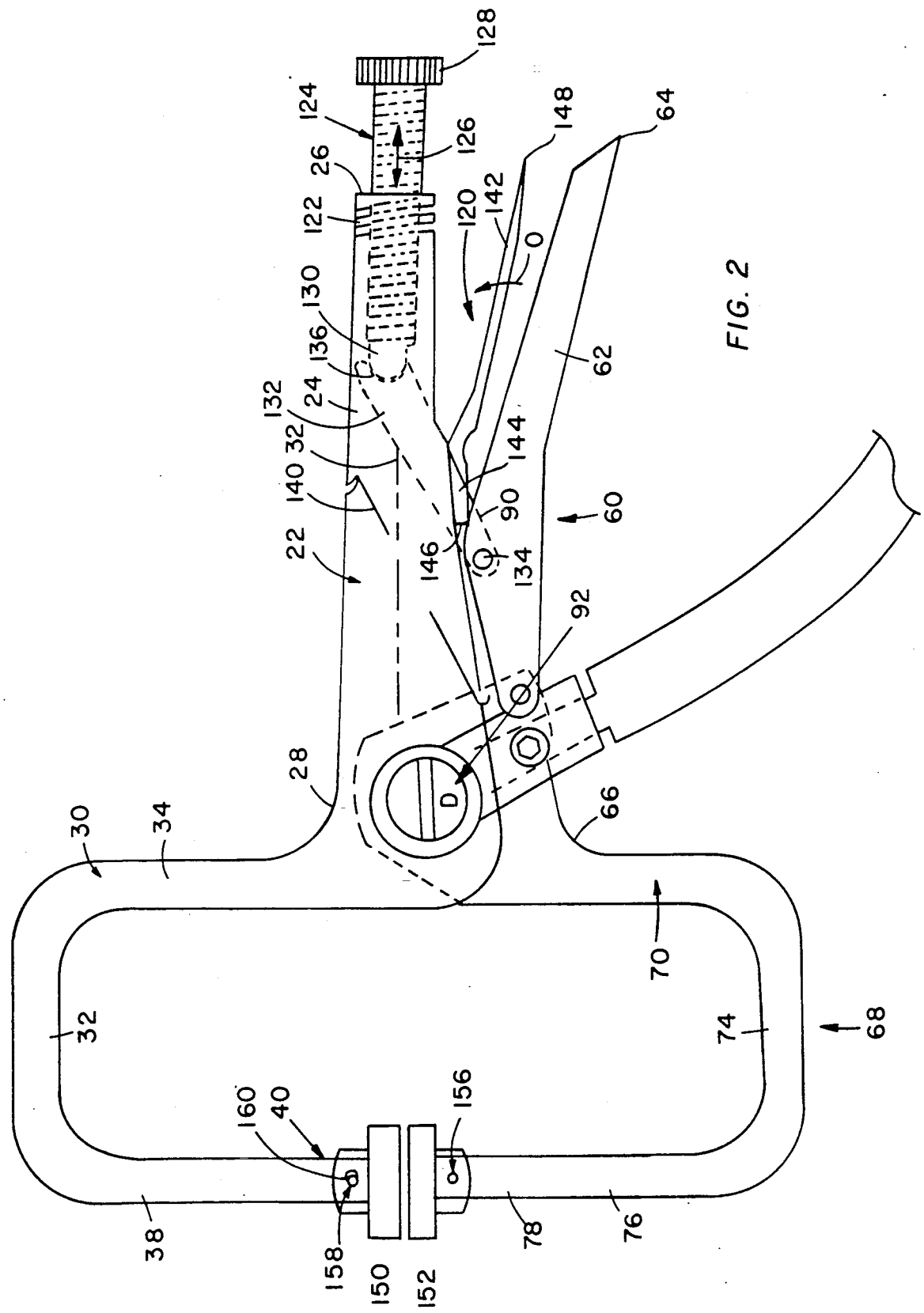
FIG. 2 is a partially cutaway view illustrating the ground clamp of the present invention.

Specifically, referring to FIGS. 1 and 2, the frame 12 includes a first monolithic leg 22 which has a handle section 24 that is grasped by a user near a rear end 26 thereof, and a neck section 28 which couples the handle to a U-shaped workpiece engaging section 30. The handle section is straight having a central longitudinal axis, and the section 30 is U-shaped to accommodate various sized workpieces. The section 30 includes a first arm 34 that extends at a right angle to the axis and a bight section 36 connected to the first arm and extending essentially parallel to the axis. A second leg 38 is connected at one end to the bight section and has a second end 40 located adjacent to the axis when the clamp is closed, as shown in FIG. 2.

As shown in FIG. 1, the leg 22 has two sides, left side 42 and right side 44 which are connected together by a top side 46 with the neck section forming two opposed ears 48 and 50 on either side of the central axis and spaced apart by a gap 54. The right and left sides are carried through the section 30 as well.

The frame 12 further includes a second leg 60 which includes a handle section 62 which extends from a rear end 64 to a neck section 66. The second leg has a U-shaped workpiece engaging section 68 on one end thereof, and the section 68 is a mirror image of the section 30. Thus, the section 68 includes a first leg 70 which extends at a right angle to the axis away from the leg 34 and is connected to a bight section 74 that extends essentially parallel to the section, and has a second arm 76 connected at one end thereof thereto. The second arm 76 includes a workpiece engaging end 78 that is located adjacent to the workpiece engaging end 40 of the first leg. As seen in FIG. 2, the two sections 30 and 68 cooperate to define a rectangular shape.

The second leg 60 is also U-shaped in cross section, and includes a right side 80, a left side 82 and a bottom side 84, with the right and left sides being spaced apart to define a gap 86 therebetween. The gap 86 is smaller than the gap 54 and the right and left sides and a pivot bridge 88 is formed near the neck section 66 that is received between the ears 48 and 50 for a purpose which will be evident from the ensuing discussion.

The second leg also includes a crown section 90 on each side thereof, also for a purpose that will be evident from the ensuing discussion.

The ears and pivot bridge form parts of a pivot means which connects the first and second legs together in a manner which permits the workpiece engaging ends 40 and 78 to move toward and away from each other as the handle section is manipulated to move the rear ends 26 and 64 away and toward each other respectively.

Figure 3:
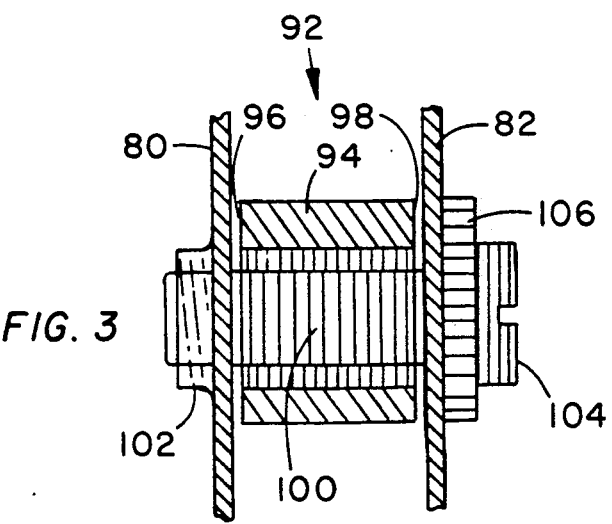
FIG. 3 is a view of a pivot connection used in the ground clamp of the present invention.

The pivot means further includes a pivot pin assembly 92, that is best shown in FIGS. 1, 2 and 3. This pivot assembly further includes a threaded cylindrical tubular brass bushing 94 that is located between the sides 80 and 82 and which has ends 96 and 98 located to abut the inner surfaces of the sides 80 and 82 respectively when a threaded brass fastener 100 is actuated by being threadably engaged with a lock nut 102 fixedly mounted on the outer surface of the side 80 and with its head 104 engaging a brass washer 106 mounted on the outer surface of the side 82.

The ground cable 20 is electrically connected to the brass pivot pin elements to thus make electrical contact with the clamp via these elements. As can be seen in FIGS. 1 and 3, the electrical paths between the cable and both of the legs 22 and 60 are essentially equal and identical. This will eliminate heating of the clamp due to an inconsistency in the electrical paths between the ground cable 20 and the workpiece engaging ends 40 and 76 of the clamp 10. That is, the electrical path between the ground cable 20 and the end 40 is essentially identical to the electrical path between the cable 20 and the end 76.

Figure 4:
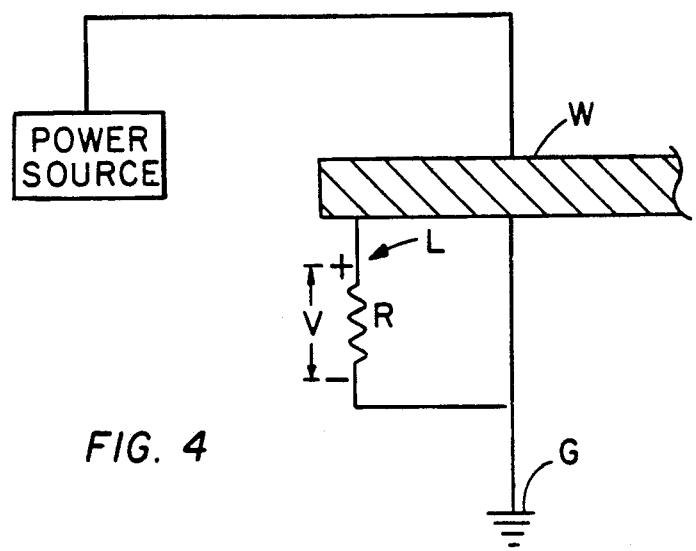
FIG. 4 is a circuit diagram illustrating the resistance heating effects of an unbalanced ground circuit.

This feature of the invention is best understood by referring to FIG. 4. As is known from standard textbooks, any metallic conductor has an electrical resistivity, which is usually expressed as resistance per unit length per unit cross sectional area. Thus, each length unit of a conductor has a certain resistance associated therewith. Thus, if one electrical path of the same conductor is longer than another, this path will have a higher resistance than the second path, and can be considered as having a resistance value if the two paths are in parallel. Thus, as is shown in FIG. 4, as between two parallel paths connecting an electrically conductive workpiece W connected to a source of power P to ground G, one path L has a resistance R; whereas a second path S has no resistance by virtue of path L being longer than path S and having a resistance value associated with the additional length of conductor times the electrical resistivity value of the conductor. Due to the existence of the resistance, there will be a voltage drop V in line L. This voltage drop will result in a heating value of $V^2/R$. The heat generated by this effect will be transferred to various parts of the handle and clamp via the usual heat transfer modes, principally conduction. This heat can degrade the connection to the ground cable, as well as the other elements of the clamp.

However, since the bushing 94 makes uniform contact with all elements of the clamp, such heating effect is not present in the clamp 10, and the resistance element R will not be present in the clamp 10.

Still father, the connection to the cable 20 is located spaced from the workpiece engaging ends 40 and 78 so the clamp can be used closely adjacent to the arc without unduly exposing the cable connection to the arc.

As shown in FIG. 2, the clamp 10 further includes a handle lock assembly 120 which combines the functions and operations of spring and screw lock assemblies. The assembly 120 includes a screw thread 122 defined in the handle leg 22 which cooperates with a screw thread on a threaded locking element 124 so as that element 124 is rotated it moves into or out of the handle assembly as indicated in FIG. 2 by the double-headed arrow 126. The locking element 124 includes a head 128 on an outer end thereof, and an arcuate knob 130 on an inner end thereof.

The assembly 120 further includes a locking arm 132 pivotally mounted on one end by a pivot pin 134 to the leg 60 at the crown 90, and having a concave knob engaging surface 136 on the other end thereof. The knob 130 engages the surface 136 and rotates the arm 132 counterclockwise as the element 124 is moved into the handle. Due to the location of the connection between the two legs with respect to the locking element, such counterclockwise movement will force the two legs apart. This movement of the legs with respect to each other will force the ends 40 and 78 towards each other to close the clamp on a workpiece located between such ends.

A spring 140 is connected at one end to the leg 22 and at the other end to the leg 60 and is set to bias those legs together against the just-discussed force of the lock assembly 120 as the element 124 is moved into the handle.

The assembly 120 further includes a release lever 142 pivotally connected to the arm 132 by a pivot pin 144 located between ends 146 and 148 of the lever 142. The end 146 slidably engages the crown 90 and when the lever is moved counterclockwise about the pivot pin 144 as indicated in FIG. 2 by the arrow O, the front end 146 exerts a force on the leg 60 that tends to move that leg away from the leg 22 and to twist the arm 132 counterclockwise about the pivot pin 134. This motion will eventually cause the concave surface 136 to move off of the knob 130, thereby releasing the lock 120. Such release will permit the spring force of the spring 140 to move the handles in such a way as to open the clamp ends 40 and 78 to release a workpiece. The arm 142 can be pressed towards the leg 60, in the clockwise direction opposite to direction O, to assist the locking of the concave surface 136 to the knob 130.

Figure 5:
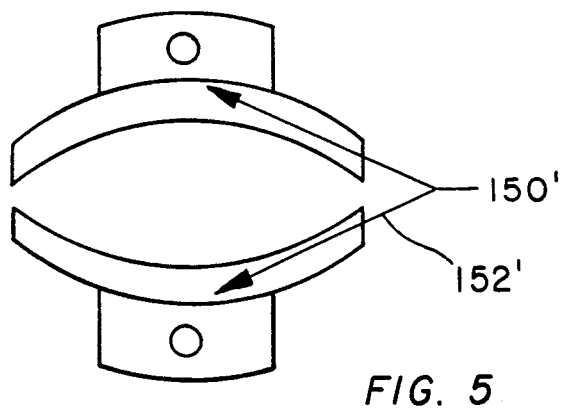
FIG. 5 is an elevational view of two arcuate workpiece contact plates.

The clamp abuts a workpiece via contact elements 150 and 152 mounted on the arm ends 40 and 78 respectively. These elements can be planar as shown in FIG. 1 or arcuate as shown for element 150' and 152' in FIG. 5 depending on the shape of the workpiece. The contact elements are attached to the arms by pivot pins 156 and 158 respectively, and can include torsion springs, such as spring 160, wrapped about the pins 156 and 158 to orient the contact elements in a desired manner with respect to the plane containing the workpiece. The contact elements are preferably brass to ensure proper electrical contact.

Figure 6:
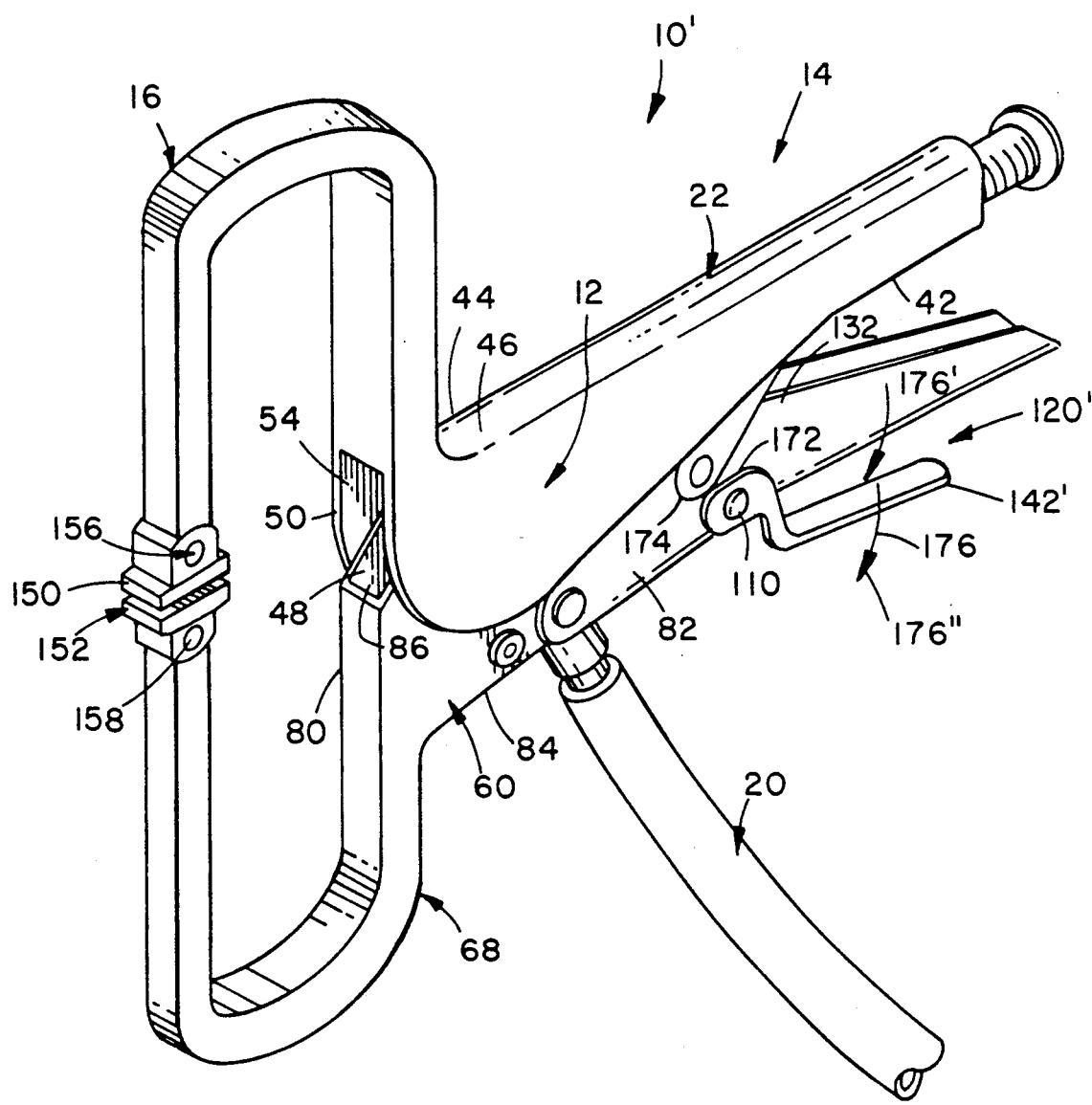
FIG. 6 is a perspective view of an alternative form of the clamp of the present invention.

A clamp 10' is an alternative form of the clamp 10, and is shown in FIG. 6. This alternative clamp 10' is identical to the clamp 10 except the locking assembly 120' of clamp 10' is slightly different from the locking assembly 120 of the clamp 10. The locking assembly 120' includes a release lever 142' that is attached to the leg 60 by a pivot pin 170, and includes a cam surface 172 which engages a cooperating cam surface 174 of the lever arm 132. The release lever 142' moves in the directions 176' and 176" as indicated by the double-headed arrow 176 to lock the lever arm 132 in a knob engaging position as discussed above and to release that lever arm 132 so the arcuate surface 136 can be moved out of engagement with the knob 130 to release the clamp from the workpiece as above discussed. The orientation of the locking lever 142' shown in FIG. 6 locks the lever arm 132 in position with the arcuate surface 136 engaged against the knob 132 due to the abutting contact between the cam surfaces 172 and 174. Moving the lever 142' in direction 176' tightens this lock, and moving the lever 142' in direction 176" releases the locking engagement between the two cam surfaces. Once the locking engagement is released, the lever arm 132 can be moved manually to move the arcuate surface 136 away from the knob 132.

It is understood that while certain forms of the present invention have been illustrated and described herein, it is not to be limited to the specific forms or arrangements of parts described and shown.

What is claimed is:

1. A ground clamp for use with welding apparatus, comprising:
    A) a workpiece engaging clamp frame which includes
        1) a first leg which includes
            (a) a handle section having a rear end and a central longitudinal axis,
            (b) a neck section,
            (c) a U-shaped workpiece engaging section extending from said neck section and having a first arm connected to said neck section and extending at an angle thereto, a bight section connected to said first arm and extending essentially parallel to said handle central longitudinal axis, a second arm connected to said bight section and having a workpiece engaging end, and
        2) a second leg which includes
            (a) a handle section having a rear end,
            (b) a neck section which engages said first leg handle section neck,
            (c) a U-shaped workpiece engaging section extending from said second leg neck section and having a first arm connected to said second leg neck section and extending away from said first leg first arm, a bight section connected to said second leg first arm and extending essentially parallel to said central longitudinal axis, a second arm connected to said second leg bight section and extending toward said first leg second arm and having a workpiece engaging end which is located adjacent to said first leg workpiece engaging end when said clamp frame is closed;
    B) pivot means connecting said first leg neck section to said second leg neck section and permitting said first and second legs to pivot thereabout to move said workpiece engaging ends toward and away from each other, said pivot means including
        (1) a threaded brass bushing,
        (2) a threaded brass fastener attached to said bushing and attaching said first leg to said and establishing an electrical connection of said first and second legs to each other and to said workpiece engaging ends,
    C) an electrical ground cable connected to said threaded brass fastener, said pivot means establishing an electrical connection between said electrical ground cable and said first leg workpiece engaging end that is essentially identical in electrical resistance value to the electrical connection between said electrical ground cable and said second leg workpiece engaging end;

D) a handle lock assembly which includes
  (1) a screw thread on said first leg adjacent to said first leg rear end,
  (2) a threaded locking element threadably engaged with said screw thread to move toward and away from said pivot means, said threaded locking element having a head on one end and a arcuate knob on another end,
  (3) a locking arm pivotally mounted at one end thereof on said second leg and having a second end with a concave knob receiving area defined thereon, said arcuate knob engaging said knob receiving area to move said first and second leg handles apart when said threaded locking element is moved toward said pivot means,
  (4) a spring connected at one end thereof to said first leg and at another end thereof to said second leg and biasing said first leg handle towards said second leg handle,
  (5) a release lever pivotally connected to said locking arm and having one end thereof in abutting contact with said second leg and being oriented to force said locking arm knob receiving area away from contact with said arcuate knob when rotated toward said first leg handle; and E) a workpiece engaging contact plate on each of said workpiece engaging ends.

2. The ground clamp defined in claim 1 further including a contact plate pivot pin connecting each contact plate to an associated one of said legs.

3. The ground clamp defined in claim 2 wherein said contact plates are arcuate.

4. The ground clamp defined in claim 2 wherein said contact plates are brass.

5. The ground clamp defined in claim 2 further including a spring on each contact plate pivot pin.

6. The ground clamp defined in claim 1 wherein said pivot means further includes a washer engaging said first leg.

7. The ground clamp defined in claim 6 wherein said pivot means further includes a lock nut fixedly mounted on said second leg.

* * * * *